United States Patent [19]

Sopko

[11] 4,401,695
[45] Aug. 30, 1983

[54] METHOD OF AND APPARATUS FOR APPLYING POWDER COATING REACTANTS

[75] Inventor: John F. Sopko, Trafford, Pa.

[73] Assignee: PPG Industries, Inc., Pittsburgh, Pa.

[21] Appl. No.: 383,644

[22] Filed: Jun. 1, 1982

[51] Int. Cl.³ .............................................. B05D 1/12
[52] U.S. Cl. .................................... 427/180; 427/168;
 239/590.5; 118/308; 118/310; 118/311
[58] Field of Search ...................... 239/590.5; 118/308,
 118/310, 311; 427/168, 180, 195; 65/60.52

[56] References Cited

U.S. PATENT DOCUMENTS

| 3,660,061 | 5/1972 | Donley et al. | 65/32 |
| 3,852,098 | 12/1974 | Bloss et al. | 117/106 R |
| 4,172,159 | 10/1979 | Marcault | 427/162 |
| 4,182,783 | 1/1980 | Henery | 427/248 B |
| 4,297,971 | 11/1981 | Henery | 118/719 |
| 4,325,988 | 4/1982 | Wagner | 427/160 |
| 4,332,838 | 6/1982 | Wegrzyn | 427/255.5 |

Primary Examiner—Shrive P. Beck
Attorney, Agent, or Firm—Donna L. Seidel

[57] ABSTRACT

A method is disclosed for depositing a coating from a gaseous stream of a powder coating reactant, wherein the carrier gas is supplied at a high volume rate (at least 100 cubic ft./min) and low pressure (not greater than one psi).

8 Claims, 1 Drawing Figure

METHOD OF AND APPARATUS FOR APPLYING POWDER COATING REACTANTS

BACKGROUND OF THE INVENTION

1. Field of the Invention

This invention relates generally to the art of depositing a coating on a substrate, especially a glass substrate, and relates more particularly to the art of depositing a coating from a powder coating composition.

2. Discussion of the Technology

Various methods of coating glass with metal or metal oxide films are well-known in the art. A technique for depositing a variety of metal oxide films onto a hot glass surface in a continuous float glass ribbon environment is described in U.S. Pat. No. 3,660,061 to Donley et al. A mixture of organometallic compounds in organic solution is sprayed onto a glass surface at a temperature high enough for thermal reaction of the organometals to form a metal oxide film. This technique produces durable metal oxide films having desirable aesthetic and solar energy control properties. Significant disadvantages are the health, safety and environmental effects of using large volumes of organic solvents.

These disadvantages may be abated by elimination of the organic solvent. A method for solventless chemical vapor deposition of coatings from vaporized powder coating reactants is described in U.S. Pat. No. 3,852,098 to Bloss et al. A powder coating reactant is dispersed into a hot stream of gas, vaporized, and conveyed to the surface to be coated, which is maintained at or above the temperature at which the coating reactant pyrolyzes to deposit a film. Although the disadvantages of a solvent system are avoided, vaporization of the coating reactant requires high temperatures, with the possibility of premature thermal reaction or decomposition of some coating reactants.

Another method of vapor deposition is described in U.S. Pat. No. 4,182,783 to Henery, wherein a solid particulate coating reactant is fluidized by introducing a volume of fluidizing gas through a mass of reactant. The fluidized mixture of coating reactant and gas is diluted with an additional volume of gas prior to delivery to the surface of the substrate to be coated. An apparatus for carrying out the technique of fluidizing a bed of solid particulate coating reactant is illustrated in U.S. Pat. No. 4,297,971 to the same inventor.

A method which avoids the health, safety and environmental problems of a solvent-based coating method, the high-temperature vaporization risks of a vapor deposition method, and the complexity of a fluidized bed powder coating method is disclosed in U.S. Pat. No. 4,325,988 to Wagner, which teaches a method and apparatus for dispersing powder coating reactants in a carrier gas stream and delivering the powder coating composition uniformly to the surface of a substrate to be coated. A powder coating reactant is obtained in very fine particle size, for example by microjet milling, and mixed with a carrier gas stream. Turbulence of the mixture is obtained by means of a baffle to maintain uniform distribution of the powder coating reactant in the carrier gas en route to the substrate to be coated. The powder coating reactant is delivered to the substrate through a nozzle positioned a short distance from the surface to be coated. The length of the nozzle is typically greater than its width, preferably substantially equal to the parallel dimension of the substrate, and is generally disposed perpendicular to the direction of relative motion between the slot and the substrate. The carrier gas is typically air supplied at a rate of 50 cubic feet per minute at a pressure of 75 pounds per square inch.

SUMMARY OF THE INVENTION

The present invention provides an improvement in powder coating uniformity and economy, achieved by supplying high volumes of carrier gas at low pressures to deliver a powder coating reactant to the surface of the substrate to be coated.

DESCRIPTION OF THE PREFERRED EMBODIMENTS

Figure 1:
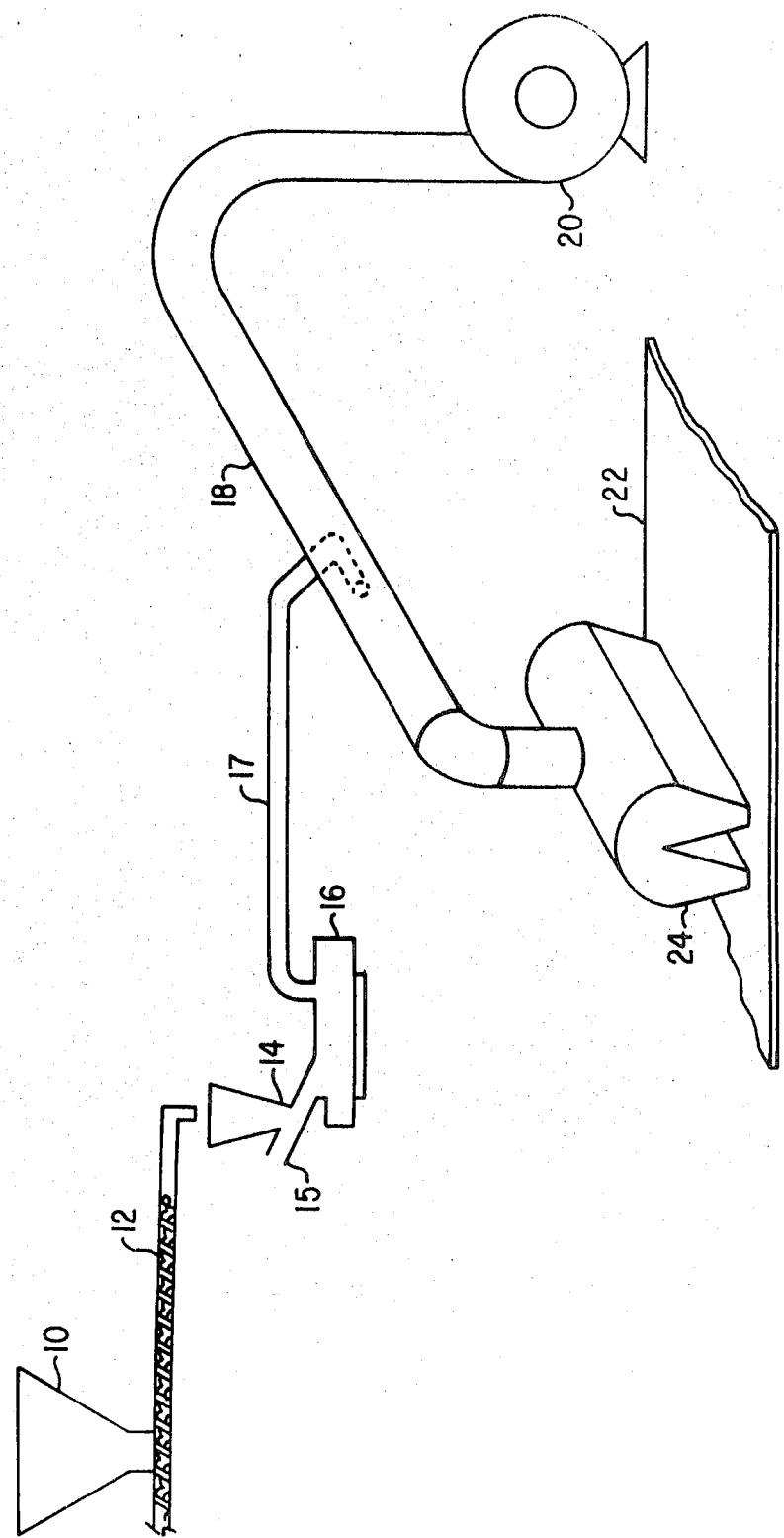
FIG. 1 illustrates the blower coating apparatus of the present invention. Powder coating reactant from a hopper 10 is metered by a screwfeeder 12 into a vaccum ejector 14 which delivers the powder, mixed with air supplied through pipe 15, into a jet mill 16. The fine milled powder coating reactant is transferred from the jet mill 16 through a delivery pipe 17 to the main transport duct 18 which is supplied with high volume, low pressure transport air by the blower 20. The powder coating reactant is conveyed in a turbulent stream of high volume, low pressure air to the surface of substrate 22 through a slot-shaped nozzle exit of a tapered chamber powder coater 24.

A substrate to be coated, preferably a sheet of glass, is maintained in a preferably horizontal position in a coating environment. In a particularly preferred embodiment, the substrate is maintained in an oxidizing atmosphere at a temperature sufficient to pyrolyze a coating reactant to deposit a metal oxide film on the surface of the substrate.

A coating reactant is obtained in the form of a powder, preferably of fairly uniform size distribution of about 500 to 600 microns or less. Coating reactants useful in accordance with the present invention include metal beta diketonates and other organic metal salts such as acetates, formates and so on. Organometallic compounds such as alkyl and aryl tin halides, particularly alkyltin fluorides, may also be used. Halogenated acetones and acetylacetonates, preferably mixtures of metal acetylacetonates, are preferred.

Preferably, acetylacetonate coating reactants are milled and/or sifted to obtain a relatively uniform size distribution. A powder comprising particles having an average diameter of about 500 to 600 microns or less is especially desirable. The powder coating reactant is mixed with a carrier gas, preferably air, and preferably at ambient temperature. The powder coating reactant may be injected, blown or aspirated into the carrier gas stream. While any means for mixing the powder coating reactant and the carrier gas may be employed, a screwfeeder is particularly suitable for metering the powder coating reactant into a vacuum ejector which delivers the powder coating reactant at a uniform controlled rate to a jet mill which effectively reduces the average particle size of the powder coating reactant to a smoke-like 0.5 to 1 micron by means of impingement of the particles and centrifugal air forces created within the jet mill. The fine milled powder is then transferred in air from the jet mill to the main transport air duct for turbulent mixing with high volume, low pressure carrier gas.

The carrier gas may be maintained at any temperature below the decomposition temperature of the coating reactant, preferably below its vaporization temperature, and most preferably ambient temperature, thereby minimizing the risks of coating reactant decomposition which can decrease the efficiency of vapor deposition methods. High volumes of carrier gas, preferably air, are delivered by means of a blower typically of the type used for tempering glass. Such blowers are capable of delivering air at volumes of several hundred cubic feet per minute and low pressures, preferably less than 1 pound per square inch, creating high velocity turbulent air flow through delivery ducts. The distribution of powder coating reactant in the carrier gas is kept substantially homogeneous enroute to the substrate by turbulent flow of the carrier gas/coating reactant mixture. In addition, little or no particulate coating reactant accumulates on the duct walls.

The uniform mixture of powder coating reactant and carrier gas is delivered at low pressure to the surface to be coated through a slot-type nozzle, defined for purposes of the present invention as having a length substantially greater than its width. The large volume air flow assures uniform distribution of high velocities across the length of the nozzle. The slot opening is preferably no more than ⅛ inch wide, and preferably is as long as the parallel dimension of the surface to be coated to enhance the uniformity of the coating. The slot is preferably disposed perpendicular to the direction of relative motion between the nozzle and the surface to be coated. A large stationary substrate may be coated by using one or more moving nozzles, or the substrate may travel past one or more stationary nozzles. The nozzle is preferably positioned less than 2 inches (about 5.1 centimeters) from the surface to be coated, preferably 0.5 to 1.5 inch (1.2 to 3.8 centimeters), thereby creating a slight back pressure that promotes uniform flow of the carrier gas/coating reactant mixture along the length of the slot to further enhance the uniformity of the coating. The high velocities, preferably greater than 2500 feet (762 meters) per minute, created as the large volume of powder/air mixture exits the nozzle maintains turbulent flow and, therefore, uniform distribution of coating reactant.

The carrier gas/coating reactant mixture contacts the surface to be coated to deposit a film. Preferably, the carrier gas/coating reactant mixture contacts a glass surface at a temperature sufficient to pyrolyze the coating reactant to form a metal oxide film, typically 950° to 1200° F. (about 510° to 650° C.). In this environment, the coating reactant/carrier gas mixture may resemble a fog or smoke as it contacts the hot glass surface. Exhaust hoods draw unreacted powder away from the surface. Recovery of unreacted powder, together with the use of high volume, low pressure carrier gas which eliminates the need for a compressor, optimizes the efficiency of this method.

The thickness of the film may be controlled by varying the rate of relative motion between the nozzle and substrate, adjusting the flow rate of the carrier gas/coating reactant mixture, by increasing or decreasing the concentration of coating reactant in the carrier gas, adjusting the distance between the nozzle and the glass surface or raising or lowering the substrate temperature. The substrate may be coated in either a horizontal or vertical orientation. The use of high volume, low pressure carrier gas provides a homogeneous mixture of powder and air in the coating chamber, a higher velocity and more uniform distribution of material from the nozzles, and improved resistance to build up of coating material within the coating apparatus, resulting in longer runs of more uniform coated product.

The present invention will be further understood from the description of specific examples which follow.

EXAMPLE I

A freshly formed float glass ribbon travels at a line speed of about 270 inches per minute (about 6.9 meters per minute) past a stationary coating apparatus. Powder dibutylin difluoride coating reactant having an average particle size of about 500 microns is reduced to about 0.5 to 1 micron in a jet mill and fed at a rate of about 200 grams per minute into a stream of air delivered at a rate of about 410 cubic feet (11.3 cubic meters) per minute and a pressure of about 0.4 pounds per square inch. The powder/air mixture is delivered through a slot-shaped nozzle 1/16 inch (about 1.6 millimeters) wide and 6 feet (about 1.8 meters) long at a velocity of about 6000 to 6500 feet (about 1800 to 2000 meters) per minute. The nozzle is positioned 1.5 inches (about 3.8 centimeters) from the glass surface to provide a back pressure which helps to maintain uniform distribution of the powder coating reactant. The glass surface is at a temperature of about 1050° F. (about 566° C.). A uniform tin oxide coating is deposited on the glass surface.

EXAMPLE II

A mixture of cobalt, iron and chromium actylacetonates having an average particle size of 500 to 600 microns is prepared by ball mixing of the solid, particulate coating reactants for about one hour. The coarse powder mixture is fed into a jet mill which reduces the reactants to an average particle size of about one micron or less. The fine powder is conveyed to a coating chamber at a rate of about 222 grams per minute in air supplied at a rate of about 276 cubic feet per minute and a pressure of about 0.4 pounds per square inch. The coating reactant dust is delivered through a slot-shaped nozzle 6 feet (about 1.8 meters) long and ⅛ inch (0.32 centimeters) wide. The gas/powder mixtures exit the nozzle at a velocity of about 4500 feet per minute, and contacts a glass surface at a temperature of about 1500° F. (about 566° C.). The nozzle is stationary at about ¾ inch (1.9 centimeters) above the glass surface while the glass ribbon is traveling by at a rate of 370 inches (9.4 meters) per minute. A metal oxide coating is formed having durability and spectral properties comparable to the properties of a coating formed from a solution of the same coating reactants.

I claim:

1. In a method for coating a substrate with a film by contacting a surface of the substrate with a powder coating reactant comprising the steps of dispersing said powder coating reactant in a carrier gas stream; creating turbulence in said stream; and delivering the powder coating reactant/carrier gas mixture to the surface to be coated, the improvement which comprises dispersing said powder coating reactant in a carrier gas which is supplied at a rate of at least about 100 cubic feet per minute and at a pressure not greater than one pound per square inch.

2. The method according to claim 1, wherein the average particle size of the reactant is reduced to less than about 10 microns.

3. The method according to claim 2, wherein the particle size is reduced by jet milling.

4. The method according to claim 1, wherein the powder coating reactant is dispersed in a carrier gas at ambient temperatures.

5. The method according to claim 1, wherein the carrier gas is air

6. The method according to claim 1, wherein the powder coating reactant/carrier gas mixture is delivered to the surface to be coated through a slot-shaped nozzle.

7. The method according to claim 6, wherein the slot-shaped nozzle is not more than 1/16 inch (1.6 millimeters) wide and is substantially as long as the parallel dimension of the surface to be coated.

8. The method according to claim 1, wherein the substrate is contacted with the coating reactant/carrier gas mixture at a temperature sufficient to pyrolyze the coating reactant.

* * * * *